United States Patent

Ji et al.

[11] Patent Number: 6,065,306
[45] Date of Patent: May 23, 2000

[54] METHOD AND APPARATUS FOR PURIFYING AMMONIA

[75] Inventors: Wenchang Ji, Doylestown, Pa.; Arthur I. Shirley, Piscataway, N.J.; Atul M. Athalye, Chatham, N.J.; Piotr J. Sadkowski, Bridgewater, N.J.

[73] Assignee: The BOC Group, Inc., New Providence, N.J.

[21] Appl. No.: 09/081,381

[22] Filed: May 19, 1998

[51] Int. Cl.[7] ........................................... F25J 1/00
[52] U.S. Cl. ................................................ 62/624
[58] Field of Search ........................... 62/624, 655, 617, 62/618, 644

[56] References Cited

U.S. PATENT DOCUMENTS

| | | | |
|---|---|---|---|
| 4,453,957 | 6/1984 | Pahade et al. | 62/640 |
| 4,594,085 | 6/1986 | Cheung | 62/646 |
| 4,681,612 | 7/1987 | O'Brien et al. | 62/624 |
| 4,752,311 | 6/1988 | MacLean et al. | 62/624 |
| 4,952,219 | 8/1990 | DiMartino | 62/655 X |
| 5,116,396 | 5/1992 | Prasad et al. | 62/655 |
| 5,281,318 | 1/1994 | Tahara | 204/182.4 |
| 5,332,424 | 7/1994 | Rao et al. | 62/624 |
| 5,409,235 | 4/1995 | Fuentes . | |
| 5,634,354 | 6/1997 | Howard et al. | 62/624 |

FOREIGN PATENT DOCUMENTS

| | | |
|---|---|---|
| 0 239 235 | 9/1987 | European Pat. Off. . |
| 0358 915A | 3/1990 | European Pat. Off. . |
| 159 259 | 3/1983 | Germany . |
| 931 051A | 6/1961 | United Kingdom . |

OTHER PUBLICATIONS

Patutina et al, "," Removal of Oil From Liquiid Ammonia, STN Chemical Abstracts (Moscow), (Jul. 28, 1986).

Druga, N. Leontitin et al., "," Process and Apparatus for Drying Materials, Chemical Abstracts (Columbus Ohio), vol. 111 (No. 2), (Jul. 10, 1989).

Xu, Youyi et al, "," Membrane Process for Separation of Ammonia/Water System and Recovery of Ammonia, Chemical Abstracts (Columbus, Ohio), vol. 123 (No. 10), (Sep. 4, 1995).

*Primary Examiner*—William Doerrler
*Attorney, Agent, or Firm*—David M. Rosenblum; Salvatore P. Pace

[57] ABSTRACT

Ammonia is purified by a membrane unit to concentrate ammonia and/or ammonia and moisture. Moisture is removed in a temperature-swing adsorption unit. The resultant product of such purification is then partially condensed to remove light components of other impurities and then partially vaporized to produce a pressurized ammonia product lean in heavy components. If the feed stream is processed through the membrane unit first, the permeate stream will be lean in such impurities as carbon dioxide, nitrogen and methane. Moisture and any carbon dioxide not removed in the membrane unit is then removed by the adsorption unit. The resultant stream produced by action of the membrane and adsorption units is then partially condensed to produce a liquid lean in light impurities. Such liquid is then partially vaporized within a product pressure vessel to produce ammonia vapor lean in heavy impurities and at a required operational pressure.

16 Claims, 2 Drawing Sheets

METHOD AND APPARATUS FOR PURIFYING AMMONIA

BACKGROUND OF THE INVENTION

The present invention relates to a method and apparatus for purifying ammonia in which an ammonia-containing stream is passed through an adsorption unit to remove moisture and a membrane unit to concentrate the ammonia. More particularly, the present invention relates to such a method and apparatus in which a stream, formed by processing the ammonia-containing stream in the adsorption and membrane units, is partially condensed and then partially vaporized to a delivery pressure to form a pressurized product stream lean in heavy and light impurities.

There are many industrial processes that require ammonia of ultra-high purity. Typically, an ammonia feed is purified to produce a product having about 1 ppm moisture, heavy impurities at about a 0.5 ppm level, and light impurities at about 0.5 ppb. Heavy impurities comprise mobile ions such as sodium and potassium, light metals such as aluminum or calcium, such heavy metals as iron, nickel or chromium, and heavy hydrocarbons. Light impurities can include nitrogen and oxygen. Purification of the ammonia feed is effected by distillation. However, the problem inherent in distillation is that it is conducted at low pressure and thus, the product stream must be recompressed. The recompression presents a risk of contamination from lubricants and the like that are used in connection with the compressor. Distillation also requires a significant amount of energy input as it is operated at low-temperature.

As will be discussed, the present invention provides a process of purifying an ammonia-containing stream in which compressors and the like are not used after the ammonia is purified.

SUMMARY OF THE INVENTION

The present invention, in one aspect, provides a method of producing a purified, pressurized ammonia stream from a feed stream comprising ammonia, moisture and other impurities. In accordance with the method, the feed stream is introduced into a membrane selected to form a permeate stream enriched in the ammonia and the moisture. An intermediate product stream is formed by adsorbing moisture from the permeate stream. The intermediate product stream is condensed to produce liquid ammonia lean in light impurities. The stream of the liquid ammonia is then introduced into a product pressure vessel. The liquid is partially vaporized within the product pressure vessel to a delivery pressure, thereby to form pressurized ammonia vapor lean in heavy impurities. The purified, pressurized ammonia stream is then formed from the pressurized ammonia vapor.

In another aspect of the present invention, a method may be conducted in which moisture may be adsorbed prior to the use of the membrane system. In this aspect of the present invention, the moisture is adsorbed from the feed stream to produce an intermediate product stream and the intermediate product stream is introduced in the membrane to form a permeate stream enriched in the ammonia. Thereafter, the permeate stream is partially condensed to produce liquid ammonia lean in light impurities. A stream of the liquid ammonia is introduced into a product pressure vessel and partially vaporized to a delivery pressure, thereby to form pressurized ammonia vapor lean in heavy impurities. The purified, pressurized ammonia stream is formed from the pressurized ammonia vapor.

In another aspect, the present invention provides an apparatus for producing a purified, pressurized ammonia stream from the feed stream comprising ammonia, moisture and other impurities. In accordance with the apparatus of the present invention, a membrane unit is provided. The membrane unit has at least one membrane selected to form a permeate stream enriched in the ammonia and the moisture. An adsorption unit is provided to adsorb moisture from the permeate stream. A product condensation vessel is used to partially condense the intermediate product stream to produce liquid ammonia lean in light impurities. A product pressure vessel is connected to the product condensation vessel to receive a stream of the liquid and to partially vaporizing the liquid to a delivery pressure, thereby to form pressurized ammonia lean in the heavy impurities. The product pressure vessel has an outlet for forming the purified, pressurized ammonia stream from the pressurized ammonia vapor.

In yet another aspect, the present invention provides an apparatus in which the adsorption unit first adsorbs the moisture from the feed stream to produce an intermediate product stream. A membrane unit is provided. The membrane unit has at least one membrane and is selected to form a permeate stream enriched from the ammonia in the intermediate products stream. A condensation unit is provided for partially condensing the permeate stream to produce a liquid lean in light impurities. A product pressure vessel is connected to the condensation unit to receive a stream of the liquid for partially vaporizing the liquid to a delivery pressure, thereby to form pressurized ammonia vapor lean and heavy impurities. The product pressure vessel has an outlet to form the pressurized ammonia stream from the pressurized ammonia vapor.

As can be appreciated from the above discussion, the condensation followed by purification constitutes both a purification step and a repressurization step without the use of a mechanical compressor and the potential contamination that could be introduced thereby. As used herein and in the claims, light impurities include, nitrogen, oxygen, carbon monoxide, carbon dioxide, and light hydrocarbons such as methane and heavy impurities include the metals and heavy hydrocarbons.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

The Figures present alternative embodiments of the present invention. In order to avoid duplication of explanation, reference numbers for the same elements have been repeated in the various Figs.

DETAILED DESCRIPTION

Figure 1:
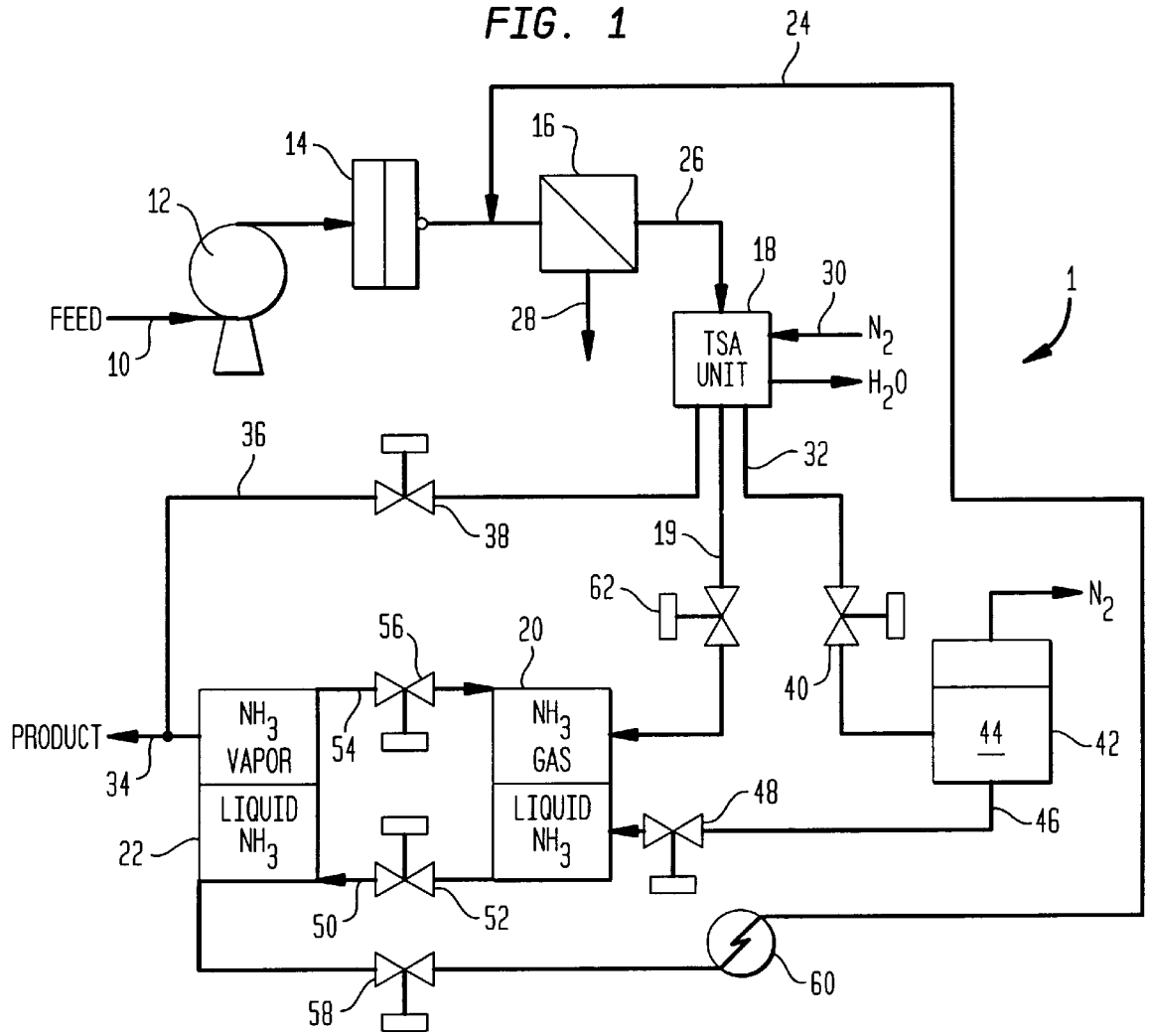
FIG. 1 is a schematic view of an apparatus for carrying out a method in accordance with the present invention.
Figure 2:
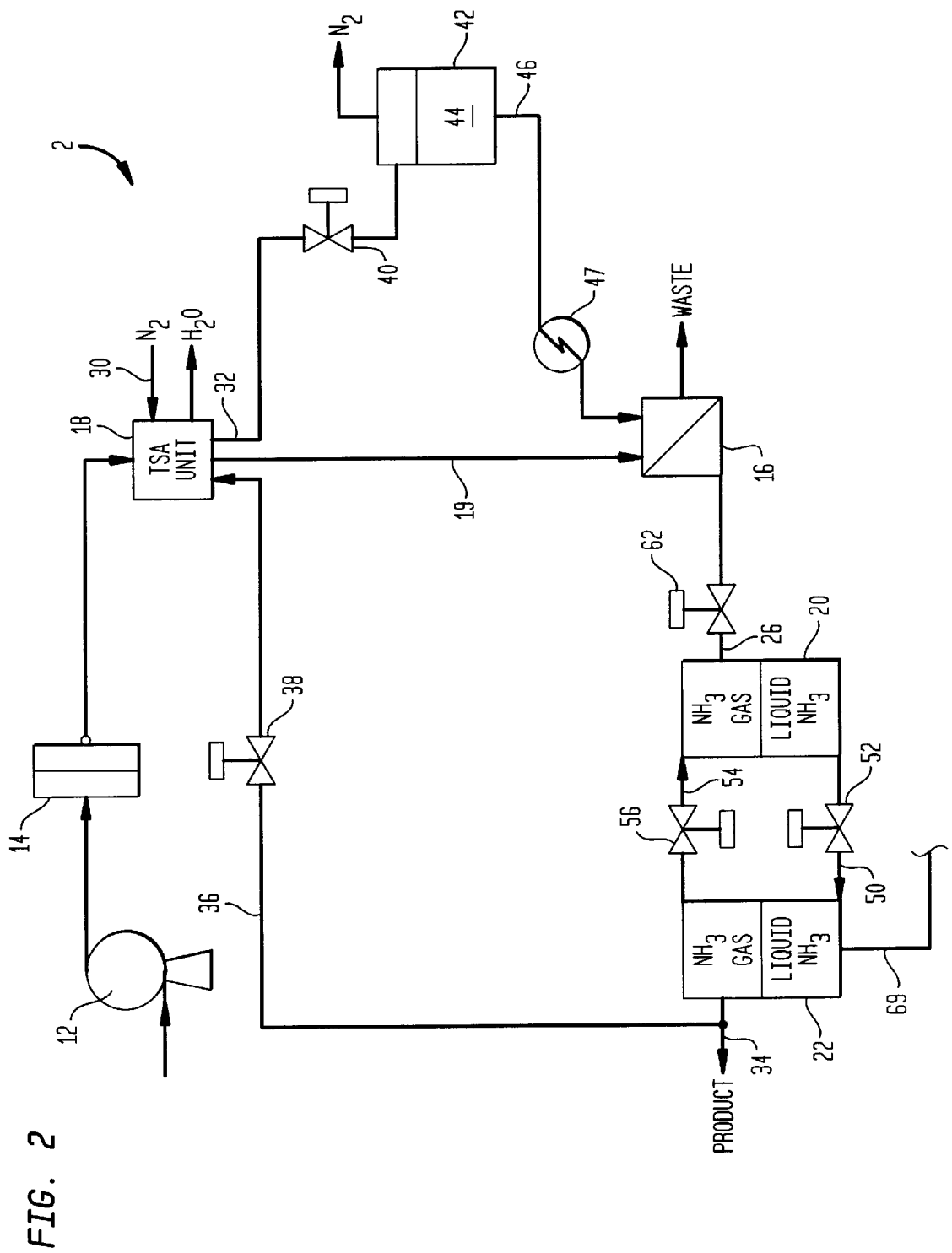
FIG. 2 is an alternative embodiment of FIG. 1 for carrying out a method in accordance with the present invention.

With reference to FIGS. 1 and 2, an apparatus 1 and an apparatus 2 are illustrated, respectively, for carrying out methods in accordance with the present invention. Generally speaking, in both apparatus 1 and 2, a feed stream 10 of ammonia is compressed by a compressor 12 and filtered by a filter 14. Feed stream 10 has a typical impurity content of no greater than about 100 ppm of gaseous impurities and also, up to about 100 ppm of metallic impurities. Ammonia, and/or ammonia and moisture (depending upon the particular embodiment set forth in FIGS. 1 and 2) in feed stream 10 is concentrated in a membrane unit 16 and moisture is removed in adsorption unit 18 to purify the ammonia.

The stream resulting from actions of membrane unit 16 and adsorption unit 18 is partially condensed in product condensation vessel 20 and is then partially vaporized in product pressure vessel 22 to a delivery pressure. The condensation produces ammonia liquid lean in light impurities and the vaporization produces ammonia vapor lean in heavy and light impurities. The vaporization within a fixed volume of the product pressure vessel 22, raises the pressure of the ammonia to a delivery pressure without subsequent compression by a compressor and thereby produces a product stream 34.

With specific reference to FIG. 1, feed stream 10 after having been compressed by compressor 12 is introduced into a filter 14, that is preferably designed to remove particles of above about 0.1 µm in size. It is understood however that filter 14 could be positioned upstream of pump 12. Thereafter, feed stream 10 and a recirculation stream 24, which shall be discussed in more detail hereinafter, is introduced into membrane unit 16. Membrane unit 16 is designed to produce a permeate stream 26 in which moisture and ammonia have been concentrated and a rejected stream 28 concentrated in carbon dioxide, carbon monoxide, oxygen, argon, hydrogen, nitrogen, methane and the like.

Membrane unit 16 can consist of one or more membranes such as those formed from a copolymer of tetrafluoroethylene and perfluro 3, 6-dioxa-4-methyl-7-octene-sulfonic acid. Preferably, such a membrane can be prepared from NAFION® polymer obtained from E. I. du Pont de Nemours and Company of Wilmington, Del., United States. Membrane unit 16 can be a single stage or a known multiple stage unit of the type in which a feed is further compressed and recirculated so that a permeate or retentate stream passes through several of cascades of membranes.

Permeate stream 26 passes through adsorption unit 18 which can be designed to operate in accordance with a temperature-swing adsorption cycle. In this regard, adsorption unit 18 can consist of multiple beds of adsorbent which can contain either alumina or zeolites such as 5A or 13X to remove moisture and any residual carbon dioxide.

In a temperature-swing adsorption process, beds of adsorbent are regenerated and operated so that each adsorbent bed is subjected to adsorption phase in which the bed is on-line and adsorbing moisture and residual carbon dioxide. While a previously regenerated bed is brought on-line, the current on-line bed is then brought off-line for regeneration. Although not specifically illustrated, but in a known manner and through the use of well-known valve trees, during the regeneration, the bed is first vented to atmosphere, from its inlet, to initiate desorption of the previously adsorbed ammonia. Thereafter, the bed is purged with a purge stream to remove ammonia from the void spaces within the adsorbent bed. A hot purge stream follows next to drive out moisture that has previously been adsorbed by the adsorbent. A product purge can then be used to drive out residual constituents of the cold and hot purge streams. The final step is to close off the bottom of the adsorbent bed and repressurize the bed with product.

In the illustrated embodiment, a cold nitrogen stream 30 is then introduced into the bed in the purge step discussed above. This cold nitrogen is recovered as a purge stream 32. Thereafter, cold nitrogen stream 30 is heated and introduced as a hot purge stream. The hot purge stream drives moisture out of the adsorbent and, although not illustrated, may be sent to a scrubber to remove any residual ammonia before being vented. Part of the ammonia product stream 34 can be recirculated as a product purge stream 36 and introduced into the temperature-swing adsorption unit to drive out nitrogen. This produces an ammonia product purge stream that is also recovered as purge stream 32. This action is controlled by a valve 38. The inlet valve to the bed being regenerated is then closed so that product purge stream 36 repressurizes the bed to operational pressure and such bed can be subsequently brought on-line.

A valve 40 can be opened to introduce purge stream 32 into a purge stream condensation vessel 42. Purge stream condensation vessel 42 can be a container or vessel sitting within a carbon dioxide bath or any other low-temperature source. Purge stream 32 partially liquefies within purge stream condensation vessel 42 to separate out the nitrogen as a vapor. The residual of liquid ammonia (designated by reference number 44) contained within purge stream condensation vessel 42 is also lean in light components of the impurities. A liquid stream 46 formed from such residual liquid, under control of a valve 48, is then introduced into product condensation chamber 20 which again can be a container or pressure vessel located within a carbon dioxide bath or other suitable low-temperature source. Intermediate product stream 19 is introduced into product condensation vessel 20 along with liquid ammonia stream 46. Liquid ammonia is then introduced as a liquid stream 50, controlled by a valve 52, into product pressurization vessel 22 where it partially vaporizes to produce ammonia vapor. Part of the ammonia vapor can be recirculated as a recirculation stream 54 (by opening a valve 56) back to condensation vessel 20 for further purification by partial condensation. Recycle stream 24 (previously mentioned) is composed of ammonia liquid that has been formed within product vaporization vessel 22. Upon the opening of a valve 58, recycle stream 24 is vaporized via a vaporizer 60 and then recirculated back to membrane unit 16 for further purification.

With additional reference to FIG. 2, intermediate product stream 19 is produced from adsorption unit 18 and hence, has had moisture removed down to levels of approximately below 1 ppm. Recovered liquid ammonia 44 from purge stream 32 can be vaporized within vaporizer 47 and combined with intermediate product stream 19 The combined stream is then introduced into membrane unit 16. It is understood that for either of the embodiments disclosed above that the recovery of ammonia from purge stream 32 is optional. The resultant permeate stream 26 is introduced into what a condensation vessel 20 by opening a valve 62. As can also be appreciated, although not illustrated, a recycle stream, such as recycle stream 24 illustrated in FIG. 1, can be recycled back to membrane unit 16. It is to be noted, however, that the use of a recycle stream is optional for either of the embodiments described herein. The product purge stream 34 can come either from the final product 34 (as illustrated), or from intermediate product stream 19. In all cases, one or more product and feed tanks may be used for feed and product storage during the purification process.

Figure 3:
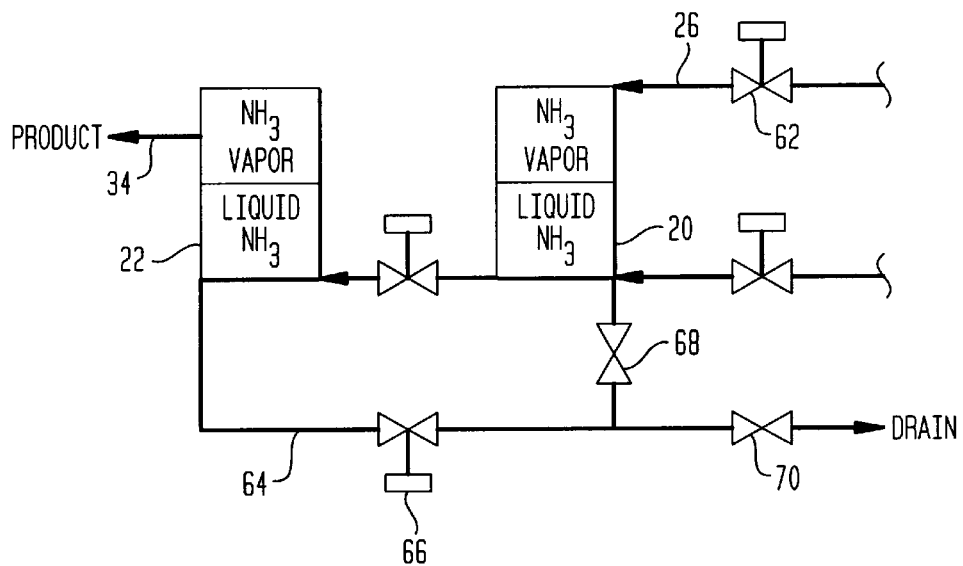
FIG. 3 is an alternative embodiment as applicable to both FIGS. 1 and 2.

With additional reference to FIG. 3, the embodiment shown in FIG. 2 (or FIG. 1 for that matter) can be modified by provision of a valve 66. Valve 66 can be opened so that a liquid stream 64 is recirculated back to product condensation vessel 20 or sent to drain. Valves 68 and 70 control the flow direction for such purposes. The advantage of such possible embodiment is that the recirculated liquid partially condenses and then partially vaporizes again to increase product purity.

In all of the embodiments discussed above, a packing material may be installed in product condensation vessel 20 and/or product pressure vessel 22 to enhance purification efficiency. Another point is that the pressure generation mechanism can also be used to replace feed compressors such as compressor 12 to produce a feed with the required pressure for temperature-swing adsorption or membrane operation.

While the invention has been described with reference to preferred embodiments, as will occur to those skilled in the art, numerous changes, additions and omissions may be made without departing from the spirit and scope of the present invention.

We claim:

1. A method of producing a purified, pressurized ammonia stream from a feed stream comprising ammonia, moisture and other impurities, said method comprising:

introducing said feed stream into a membrane selected to form a permeate stream enriched in said ammonia and said moisture;

forming an intermediate product stream by adsorbing moisture from said permeate stream;

partially condensing said intermediate product stream to produce liquid ammonia lean in light components of said other impurities; and introducing a stream of said liquid into a product pressure vessel;

partially vaporizing said liquid to a delivery pressure, thereby to form pressurized ammonia vapor lean in heavy components of said other impurities; and forming said purified, pressurized ammonia stream from said pressurized ammonia vapor.

2. A method of producing a purified, pressurized ammonia stream from a feed stream comprising ammonia, moisture and other impurities, said method comprising:

adsorbing said moisture from said feed stream to produce an intermediate product stream;

introducing said intermediate product stream into a membrane selected to form a permeate stream enriched in said ammonia;

partially condensing said permeate stream to produce liquid ammonia lean in light components of said other impurities; and introducing a stream of said liquid into a product pressure vessel;

partially vaporizing said liquid to a delivery pressure, thereby to form pressurized ammonia vapor lean in heavy components of said other impurities; and forming said purified, pressurized ammonia stream from said pressurized ammonia vapor.

3. The method of claim 1, wherein:

said moisture is adsorbed in adsorbent beds subjected to an out-of-phase cycle so that while each of said adsorbent beds is adsorbing said moisture, at least one other bed is off-line and being regenerated by subjecting such other bed to the steps of nitrogen purging to help remove ammonia from void spaces in adsorbent contained within said adsorbent beds, thereby to form a purge product stream comprising nitrogen and ammonia, heated nitrogen purging to cause desorption of said moisture, thereby to regenerate said adsorbent, a product purge with a product purge stream to purge nitrogen introduced by said nitrogen and heated nitrogen purging steps, and a repressurization step to bring said at least one other bed up to operating pressure so that it can be brought on-line to adsorb moisture; and said product purge stream is formed from part of said purified, pressurized ammonia stream.

4. The method of claim 3, wherein:

said purge product stream is cooled so that said ammonia contained therein is liquefied and separated from said nitrogen; and a liquid ammonia stream is introduced into said liquid ammonia condensed from said intermediate product stream.

5. The method of claim 2, wherein:

said moisture is adsorbed in adsorbent beds subjected to an out-of-phase cycle so that while each of said adsorbent beds is adsorbing said moisture, at least one other bed is off-line and being regenerated by subjecting such other bed to the steps of nitrogen purging to help remove ammonia from void spaces in adsorbent contained within said adsorbent beds, thereby to form a purge product stream comprising nitrogen and ammonia, heated nitrogen purging to cause desorption of said moisture, thereby to regenerate said adsorbent, a product purge with a product purge stream to purge nitrogen introduced by said nitrogen and heated nitrogen purging steps, and a repressurization step to bring said at least one other bed up to operating pressure so that it can be brought on-line to adsorb moisture; and said product purge stream is formed from part of said purified, pressurized ammonia stream.

6. The method of claim 5, wherein:

said purge product stream is cooled so that said ammonia contained therein is liquefied and separated from said nitrogen; and a liquid ammonia stream is vaporized and introduced into said membrane.

7. The method of claim 1 or claim 2, wherein said part of the liquid ammonia condensed from said intermediate product stream is recycled as a recycle stream back to said membrane.

8. The method of claim 1 or claim 2, wherein part of the pressurized ammonia vapor is reliquefied along with said intermediate product stream.

9. An apparatus for producing a purified, pressurized ammonia stream from a feed stream comprising ammonia, moisture and other impurities, said apparatus comprising:

a membrane unit having at least one membrane selected to form a permeate stream enriched in said ammonia and said moisture;

an adsorption unit to adsorb moisture from said permeate stream;

a product condensation vessel to partially condense said intermediate product stream to produce a liquid lean in light components of said other impurities; and a product pressure vessel connected to said product condensation vessel to receive a stream of said liquid for partially vaporizing said liquid to a delivery pressure, thereby to form pressurized ammonia vapor lean in heavy components of said other impurities;

said product pressure vessel having an outlet of for forming said purified, pressurized ammonia stream from said pressurized ammonia vapor.

10. An apparatus for producing a purified, pressurized ammonia stream from a feed stream comprising ammonia, moisture and other impurities, said apparatus comprising:

an adsorption unit having an adsorbent to adsorb said moisture from said feed stream to produce an intermediate product stream;

a membrane unit having at least one membrane selected to form a permeate stream enriched in said ammonia from said intermediate product stream;

a condensation unit for partially condensing said permeate stream to produce a liquid lean in light components of said other impurities; and a product pressure vessel connected to said condensation unit to receive a stream of said liquid for partially vaporizing said liquid to a delivery pressure, thereby to form pressurized ammonia vapor lean in heavy components of said other impurities;

the product pressure vessel having an outlet to form said purified, pressurized ammonia stream from said pressurized ammonia vapor.

11. The apparatus of claim 9, wherein:

said adsorption unit has adsorbent beds subjected to an out-of-phase cycle so that while each of said adsorbent beds is adsorbing said moisture, at least one other bed is off-line and being regenerated by subjecting such other bed to the steps of nitrogen purging to help remove ammonia from void spaces in adsorbent contained within said adsorbent beds, thereby to form a purge product stream comprising nitrogen and ammonia, heated nitrogen purging to cause desorption of said moisture, thereby to regenerate said adsorbent, a product purge with a product purge stream to purge nitrogen introduced by said nitrogen and heated nitrogen purging steps, and a repressurization step to bring said at least one other bed up to operating pressure so that it can be brought on-line to adsorb moisture; and said adsorption unit is connected to said outlet of said product pressure vessel so that said product purge stream is formed from part of said purified, pressurized ammonia stream.

12. The apparatus of claim 11, further comprising:

a purge stream condensation vessel connected to said adsorption unit for cooling said purge product stream, thereby to liquefy said ammonia contained therein and therefore separate said ammonia from said nitrogen; and said purge stream condensation vessel is connected to said product condensation vessel so that a liquid ammonia stream is introduced into said product condensation vessel.

13. The apparatus of claim 10, wherein:

said adsorption unit has adsorbent beds subjected to an out-of-phase cycle so that while each of said adsorbent beds is adsorbing said moisture, at least one other bed is off-line and being regenerated by subjecting such other bed to the steps of nitrogen purging to help remove ammonia from void spaces in adsorbent contained within said adsorbent beds, thereby to form a purge product stream comprising nitrogen and ammonia, heated nitrogen purging to cause desorption of said moisture, thereby to regenerate said adsorbent, a product purge with a product purge stream to purge nitrogen introduced by said nitrogen and heated nitrogen purging steps, and a repressurization step to bring said at least one other bed up to operating pressure so that it can be brought on-line to adsorb moisture; and said adsorption unit is connected to said outlet of said product pressure vessel so that said product purge stream is formed from part of said purified, pressurized ammonia stream.

14. The apparatus of claim 13, further comprising:

a purge stream condensation vessel connected to said adsorption unit for cooling said purge product stream, thereby to liquefy said ammonia contained therein and therefore separate said ammonia from said nitrogen; and a vaporizer connected to said purge stream condensation unit to vaporize said ammonia contained therein; and said vaporizer connected to said membrane unit to introduced ammonia vaporized in said vaporizer into said membrane unit.

15. The apparatus of claim 9 or claim 10, wherein said product pressure vessel is connected to said membrane unit so that part of the liquid ammonia condensed from said intermediate product stream is recycled as a recycle stream back to said at least one membrane.

16. The apparatus of claim 9 or claim 10, wherein said product pressure vessel is connected to said product condensation vessel so that part of the pressurized ammonia vapor is reliquefied along with said intermediate product stream.

* * * * *